UNITED STATES PATENT OFFICE.

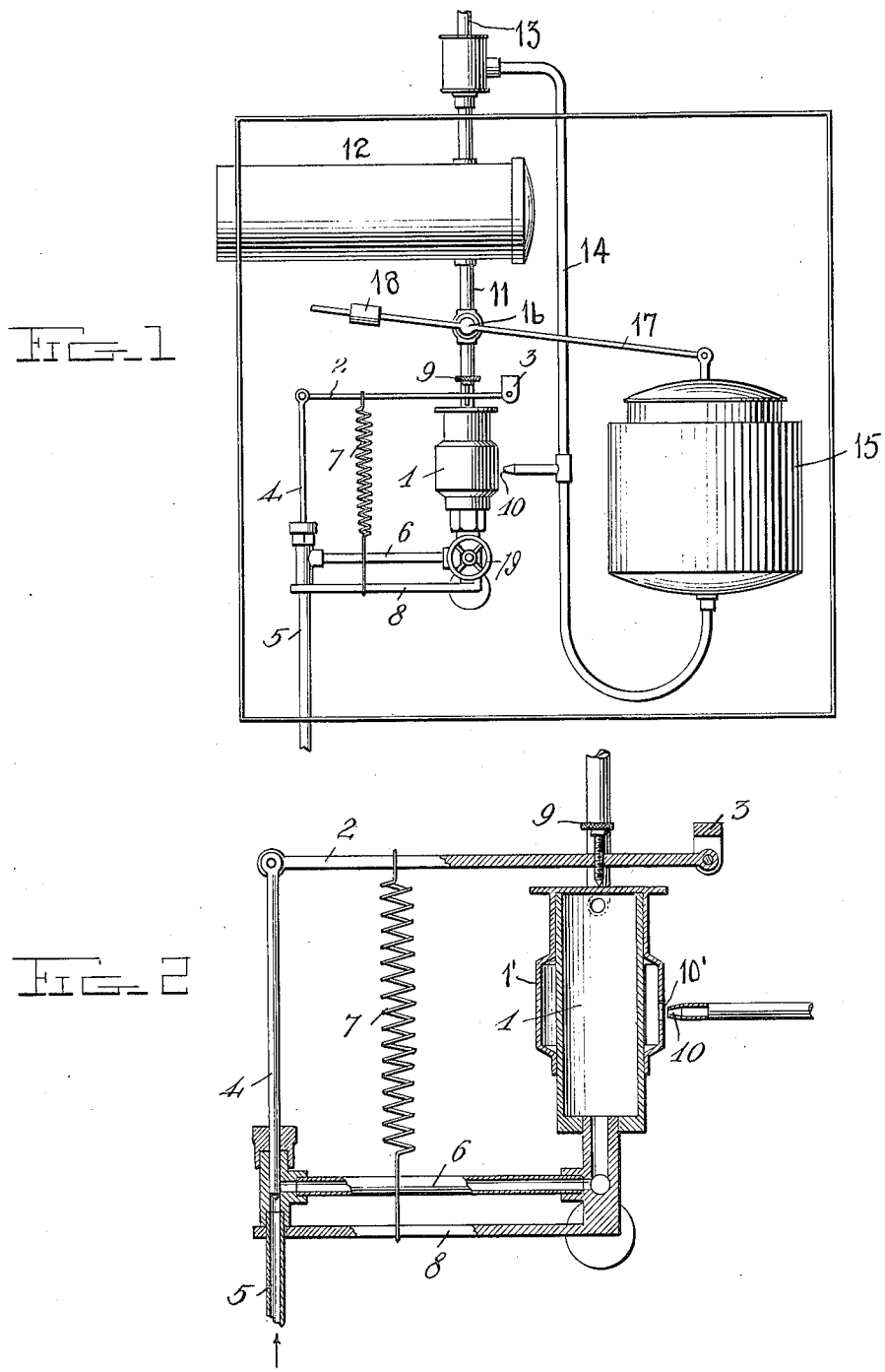

HANS C. HANSON, OF ALBERT LEA, MINNESOTA.

MEANS FOR AUTOMATICALLY REGULATING THE SUPPLY OF OIL TO GAS-GENERATORS.

No. 875,173.　　　Specification of Letters Patent.　　　Patented Dec. 31, 1907.

Application filed March 8, 1907. Serial No. 361,293.

*To all whom it may concern:*

Be it known that I, HANS C. HANSON, a citizen of the United States, residing at Albert Lea, in the county of Freeborn and State of Minnesota, have invented certain new and useful Improvements in Means for Automatically Regulating the Supply of Oil to Gas-Generators; and I do declare the following to be a full, clear, and exact description of the invention, such as will enable others skilled in the art to which it appertains to make and use the same.

This invention relates to improvements in regulators for hydro-carbon generators, and more particularly to an automatic cut-off valve for the same, and has for its purpose to provide a device of this kind which will prevent the gasolene from going into the generator before it is thoroughly heated, and thereby prevent the escape of the gasolene and the possibility of danger arising therefrom.

In the accompanying drawings, which illustrate the invention,—Figure 1 is a side elevation of one form of generator provided with my improved cut-off valve; and Fig. 2 is a vertical sectional view through the cut-off mechanism.

Referring more particularly to the drawings, 1 indicates the generator, which may be of any desired form and construction the one shown and described in my former Patent No. 757,615, April 19, 1904, being preferred.

2 indicates a lever, which is pivotally secured at one end to a suitable support, 3, and has its other end connected with a valve stem, 4. The valve is located in the service pipe, 5, at any suitable point, preferably where a pipe, 6, leads therefrom into the bottom of the generator and is adapted to be held upon its seat so as to close the same by means of a spring, 7. One end of the spring engages with the lever, 2, and the other end with an arm, 8, which extends outward from the bottom of the generator, 1, and engages with the service pipe, 5. A screw, 9, projects through the lever, 2, near its pivotal point with the support, 3, and is adapted to engage with the top of the generator and thereby hold the valve on the stem, 4, in the desired position relative to its seat in the pipe, 5.

Normally the screw, 9, is so adjusted that when the generator is cold the valve will rest firmly upon its seat and close the passage through the service pipe and thereby prevent the entrance of any oil into the generator until after the generator has been heated in any desired manner, as by the sub-flame, 10, which enters the outer shell 7', through a perforation 10', as shown in Fig. 2. However, as soon as the generator has been heated sufficiently to vaporize the oil, it will expand to such a degree as to lift the lever by means of the screw, 9, and thereby raise the valve off its seat and permit the entrance of the oil into the generator. After the oil has been shut off from the service pipe by means of the valve, 19, therein and the generator cools, it will assume its normal condition and permit of the downward movement of the lever until the valve is again seated. The tension of the spring, 7, is sufficient to always close the valve and prevent the entrance of the oil, but is not strong enough to prevent the upward movement of the lever from the expansion of the generator.

When the generator is in operation the oil enters the generator 1 through the pipes 5 and 6 and the gas generated therefrom passes through a pipe 11 that communicates with a tank or mixing chamber 12. From said chamber the main portion of the gas passes through a pipe 13 to the point of consumption, while a smaller portion of it passes through a pipe 14 to a receiver or gasometer 15 which supplies the burner 10. The movement of the gasometer by the entrance of gas thereinto causes it to regulate the flow of the gas through the pipe 11 by automatically moving the valve 16 by a rod or lever 17. The operation of the lever is controlled by a counter weight 18 on its free end.

As above described, it is evident that when a generator is provided with my improved automatic cut-off valve, it will be impossible to cause an overflow of the oil through the valve, for, if the generator has not been heated to the desired degree, it will be impossible for the oil to enter even though the ordinary controlling valve 19 in the pipe 6 should be opened.

Having described my invention, I claim:—

1. In combination, a gas generator provided with external heating means, an oil supply pipe leading to the interior of the generator provided with two valves, means for normally holding the valve farthest from the generator seated, a lever pivotally mounted adjacent to the generator and adapted to engage therewith, and means for connecting the normally seated valve with said lever so as to automatically open the valve only when the generator reaches a temperature sufficiently high to volatilize the oil.

2. In combination, a gas generator provided with external heating means, an oil supply pipe leading to the interior of the generator, two valves in said pipe, the one nearest the generator being movable toward and from its seat, means for normally holding the last mentioned valve on its seat, a lever pivotally mounted adjacent to the generator and adapted to adjustably engage therewith, and means for connecting the free end of the lever with the normally seated valve so as to unseat the valve whenever the generator reaches a temperature sufficiently high to volatilize the oil.

3. In combination, a gas generator provided with external heating means, an oil supply pipe communicating with the interior of the generator and provided with two valves, the valve nearest the generator being hand actuated and the other one being movable toward and from its seat, an arm projecting from the bottom of the generator, the outer end of which engages with said pipe, a lever pivotally mounted adjacent to the generator, a screw in the lever for engaging with the generator, means for connecting the lever with the normally seated valve, and a spring engaging with the lever at one end and with said arm at the other and adapted to hold said valve on its seat until the generator reaches a temperature sufficiently high to volatilize the oil.

In testimony whereof I have hereunto set my hand in presence of two subscribing witnesses.

HANS C. HANSON.

Witnesses:
S. K. SWENSON,
RUTH SORENSON.